Jan. 20, 1970  E. M. LATTERMAN ET AL  3,490,787
TRACTOR COUNTERWEIGHT ASSEMBLY
Filed June 6, 1968  2 Sheets-Sheet 1
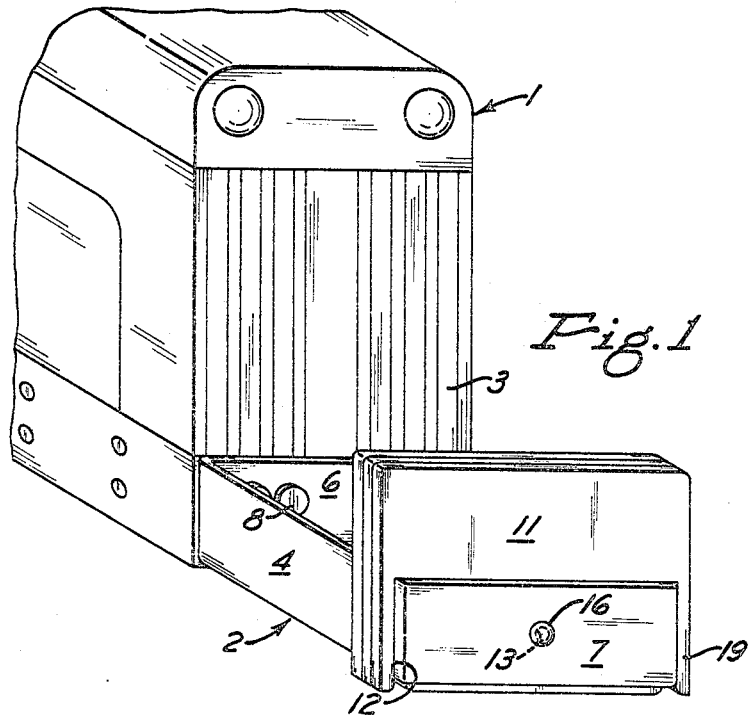
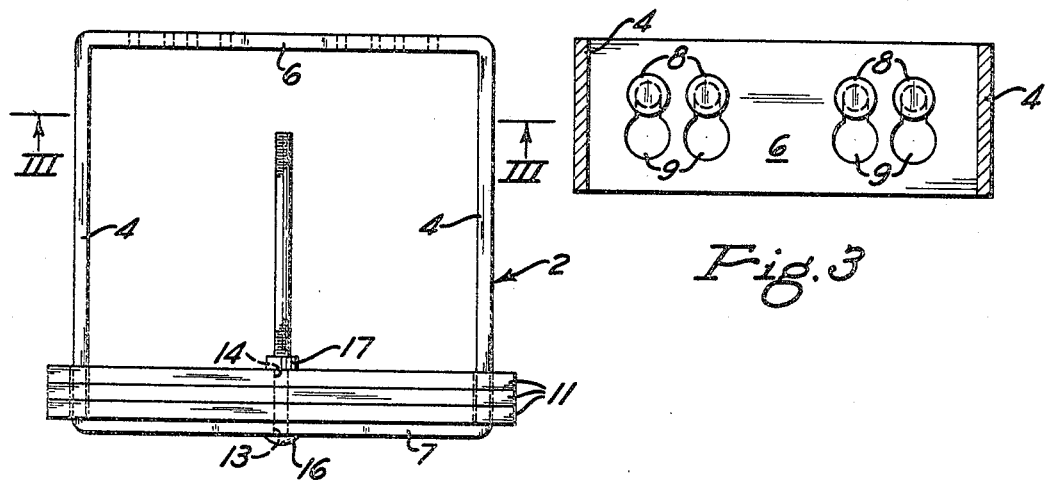
INVENTORS.
EARL M. LATTERMAN
RICHARD E. LACEY
BY
Brown, Critchlow, Flick & Peckham
ATTORNEYS.

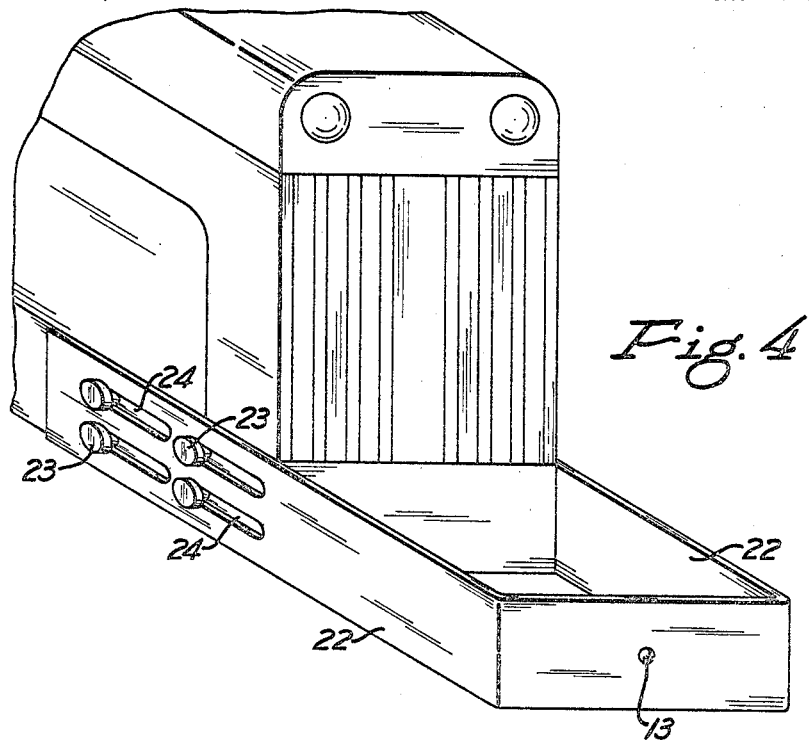
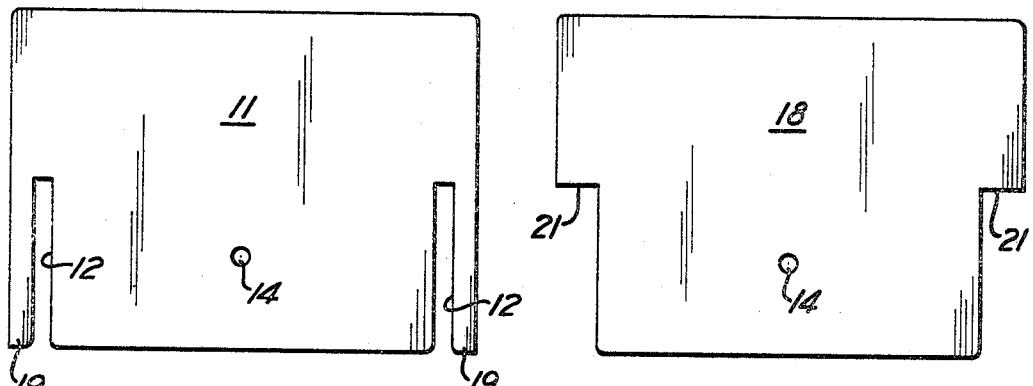

United States Patent Office
3,490,787
Patented Jan. 20, 1970

3,490,787
TRACTOR COUNTERWEIGHT ASSEMBLY
Earl M. Latterman, Pittsburgh, and Richard E. Lacey, McKeesport, Pa., assignors to Tygart Industries, Inc., McKeesport, Pa., a corporation of Pennsylvania
Filed June 6, 1968, Ser. No. 735,110
Int. Cl. B60r 19/00, 27/00
U.S. Cl. 280—150　　　　　　　　　　　　　　8 Claims

ABSTRACT OF THE DISCLOSURE

This invention relates to a counterweight assembly for tractor-like vehicles and, more particularly, to such an assembly in which the counterweights proper consist of plurality of individual plate-like elements that can be easily added to or removed from a supporting frame to provide a counterbalancing force having a maximum moment arm. The supporting frame is itself readily detachable from the vehicle and includes horizontally extending spaced parallel side members connected to one end of the vehicle. The counterweight plates are supported on edge by the side members, with the first plate mounted adjacent the outer end of the supporting frame remote from the vehicle and with the second plate mounted adjacent the first plate on the side thereof towards the vehicle. Additional plates, if required, are similarly mounted adjacent the vehicle side of the last previously mounted plate. Means are provided for detachably securing the plates together as a unitary mass in the positions described. A transverse member preferably extends across the outer end of the frame to serve as a bumper.

---

In the conventional design of counterweights for tractors and like vehicles, where the counterweights consist of a plurality of separate weights, the initial or first weight is fastened directly to one end of the vehicle, the second weight is supported adjacent the side of the first weight that is remote from the vehicle, and so on for the third and subsequent weights. In this arrangement, the effective moment arm of the weights is a minimum, particularly when only one or a few weights are used. As a result, a greater number of individual weights have to be used to obtain the desired counterbalancing effect, or the individual weights have to be heavier, often to the extent that they can no longer be easily handled by one man.

It is among the objects of this invention to provide a counterweight assembly, in which the desired counterbalancing is obtained by a plurality of individual weights that can be easily handled by one man, in which the weights are mounted to produce a maximum counterbalancing effect with the fewest number of weights, and in which the frame for supporting the weights is readily detachable from the vehicle and, if desired, adjustable to vary the moment arm of the weights and is provided with a transverse member adapted to act as a bumper at the front or rear of the vehicle.

The foregoing and other objects will be apparent from the following description of a preferred embodiment of the invention in connection with the attached drawings, in which FIG. 1 is a fragmentary perspective view of the front end of a tractor, having attached thereto a counterweight assembly made in accordance with this invention;

FIG. 2 is a plan view of the counterweight assembly of FIG. 1;

FIG. 3 is a partial vertical section along the line III—III of FIG. 2;

FIG. 4 is a perspective view of an adjustable form of counterweight supporting frame mounted on the front end of a tractor;

FIG. 5 is a front elevation of one of the individual counterweights shown in FIG. 1; and FIG. 6 is a similar elevation of a modified form of individual counterweight.

Referring to the drawings, the front end of a farm tractor 1 is shown in fragmentary and diagrammatic perspective outline in FIG. 1. A supporting frame 2 is attached to the front end of the tractor below the radiator 3. The frame is generally rectangular and includes parallel side members 4, a transverse mounting member 6, and a transverse front member 7. The frame is rigidly attached to the main frame of the tractor by bolts 8 inserted through keyhole slots 9 in the mounting member 6 (see FIG. 3). By loosening the bolts, the supporting frame may be easily removed from or mounted on the front of the vehicle. All of the components of the frame 2 are made of sufficiently heavy steel to withstand not only the normal wear encountered in use but also to permit the transverse front member 7 to function as a bumper for pushing other vehicles or implements.

The individual counterweight members 11 are preferably steel plates, having a generally rectangular shape shown in detail in FIGS. 5 and 6. The thickness of each plate is determined by the desired maximum weight, which in most cases should be under 100 pounds. The weight shown in FIG. 5 is provided with spaced slots 12 parallel its side edges and extending from the bottom edge of the plate 1 to about half its height. The width of each slot and the distance between slots are such that the weight will rest on the supporting frame with the side members 4 received within the slots. Sufficient clearance is provided so that the individual weights, when inserted from above onto and between the side members, may slide longitudinally of the frame towards the transverse front member 7. One or more holes 13 through the front member register with similar holes 14 in the individual weights when they are stacked against the front member as shown in FIGS. 1 and 2. Through these aligned holes, a bolt 16 may be passed as shown in FIG. 2, and a nut 17 run up on the other end to secure the weights in stacked relation and to the frame. If only one weight is used, it is placed immediately adjacent the outer end of the frame where it is at a maximum distance from the center of gravity of the vehicle, thereby exerting a maximum effective moment. Similarly, when one or more additional weights are needed, they are supported on the side members and are drawn up tight against each other in stacked array against the first weight to provide a unitary counterweight mass at maximum distance from the center of gravity of the vehicle.

A modified form of a counterweight member 18 is shown in FIG. 6. It has the same general shape as weight 11, except that the outer side legs 19 of weight 11 have been eliminated so that weight 18 is supported on the side members 4 by the horizontal abutments 21 (comparable to the top edge of the slots on weight 11), with the depending central portion of the weight received between those members. It is a feature of both weights 11 and 18 that they are of a size and shape that is easily handled and capable of ready mounting on and removal from the supporting frame.

FIG. 4 shows a modified form of supporting frame of generally rectangular shape with one open end. Here, the side members 22 extend along and outside the side frames (not shown) of the tractor and are adjustably mounted thereon by bolts 23 inserted through slots 24 in the side members. In this way, the outer end of the supporting frame can be extended or retracted relative to the front of the tractor, permitting the frame to accommodate, if so desired, additional weights supported and secured in place as previously described. Another advantage of the adjustable supporting frame is that it permits the moment arm of even a few weights to be increased until such weights are the equivalent in counterbalancing effect of the same weights, plus one or more additional weights, supported on the frame of FIG. 1. A further advantage of the supporting frame shown in FIG. 4 is that the moment arm of the weights can be substantially increased in the field to suit the conditions actually encountered at a time when additional weights may not be available.

According to the provisions of the patent statutes, we have explained the principle of our invention and have illustrated and described what we now consider to represent its best embodiment. However, we desire to have it understood that, within the appended claims, the invention may be practiced otherwise than as specifically illustrated and described.

What we claim is:

1. A counterweight assembly for a vehicle, comprising a supporting frame that includes spaced parallel side members, means for rigidly connecting the frame to the vehicle with the frame extending generally horizontally and with the outer end thereof spaced from the vehicle, a plurality of individual plate-like counterweights removably supported on edge by the side members, and means for detachably securing the counterweights to that portion of the frame remote from the vehicle to increase the effective moment of the counterweights.

2. A counterweight assembly according to claim 1, in which each counterweight is provided adjacent each side edge thereof with a vertical slot opening on the bottom edge of the counterweight, said slots being so spaced and so dimensioned as to receive the side members of the supporting frame.

3. A counterweight assembly according to claim 1, in which each counterweight is provided adjacent each end thereof with a horizontally extending abutment for engaging the top portion of a side member of the frame for supporting the counterweight thereon.

4. A counterweight assembly according to claim 1, in which the counterweights are disposed in horizontally stacked vertical planes, and in which the frame also includes a transverse outer end member to which the counterweights are secured.

5. A counterweight assembly according to claim 4, in which the frame also includes a second transverse member connected to the side members and extending parallel to but spaced from the transverse outer end member, and means for securing the second transverse member to the vehicle.

6. A counterweight assembly according to claim 4, in which the frame is mounted on the front of the vehicle and the transverse outer end member serves as a bumper.

7. A counterweight assembly according to claim 4, in which a portion of the side members of the frame overlaps the sides of the vehicle and are adjustably secured thereto for extending or retracting the transverse outer end member relative to the adjacent end of the vehicle.

8. A counterweight assembly according to claim 4, in which the means for connecting the supporting frame to the vehicle include threaded means that permit the frame to be readily removed from the vehicle.

References Cited

UNITED STATES PATENTS

| | | | |
|---|---|---|---|
| 1,756,106 | 4/1930 | Swenson | 212—49 |
| 1,785,119 | 12/1930 | Gorsuch et al. | 214—762 |
| 2,701,728 | 2/1955 | Miller | 293—69 XR |
| 2,854,247 | 9/1958 | Doxtator | 280—106 |

DRAYTON E. HOFFMAN, Primary Examiner

H. BELTRAN, Assistant Examiner

U.S. Cl. X.R.

212—49; 214—762; 280—106; 293—69